April 30, 1968  C. E. DALE  3,380,607
TRANSPORT EQUIPMENT
Filed April 18, 1966  4 Sheets-Sheet 2
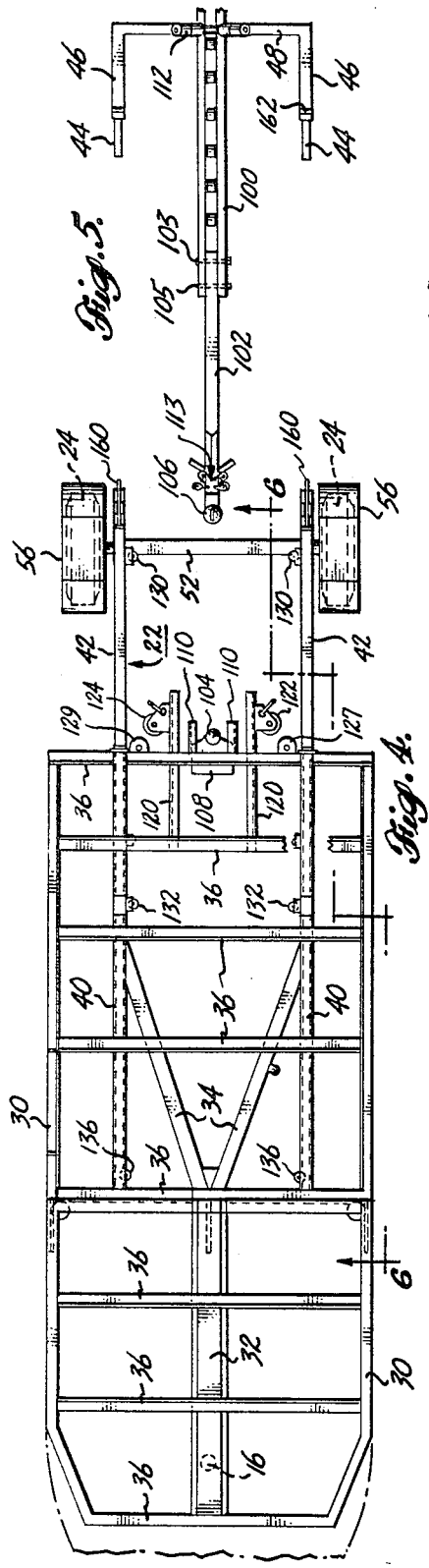
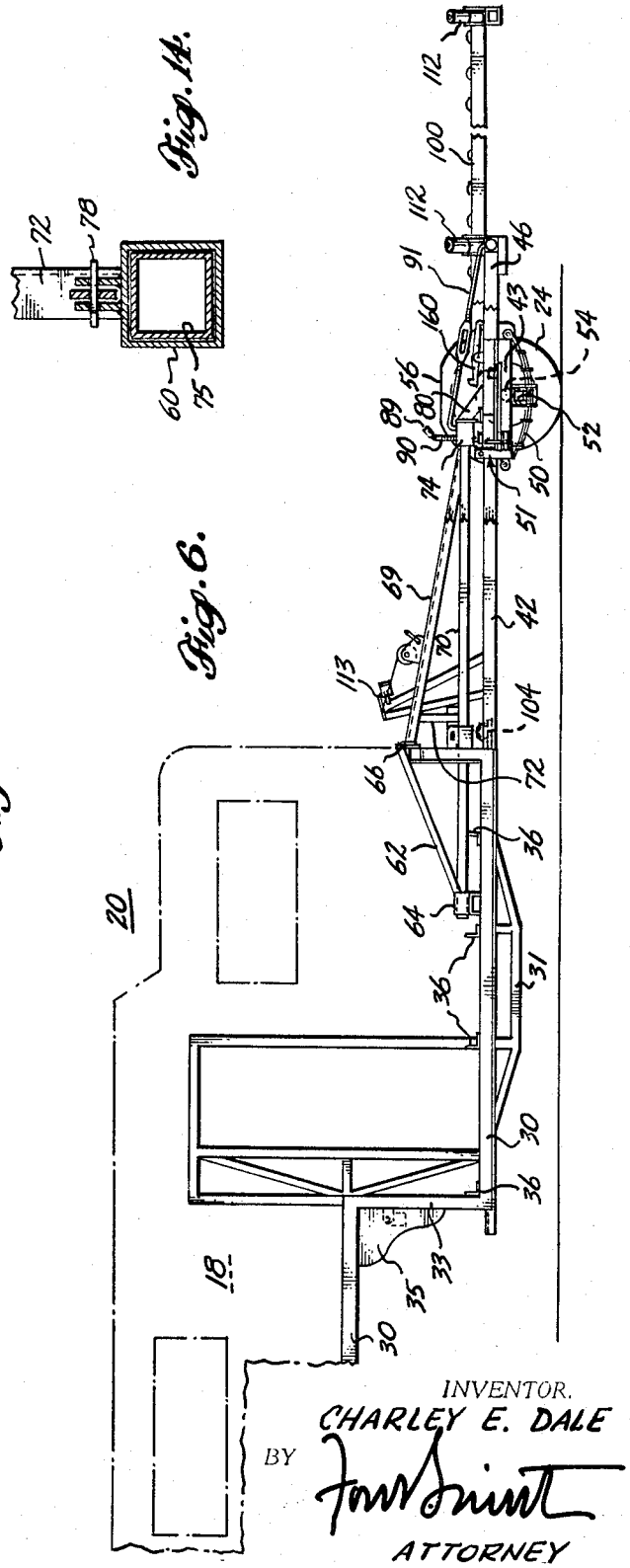
INVENTOR.
CHARLEY E. DALE
BY
ATTORNEY

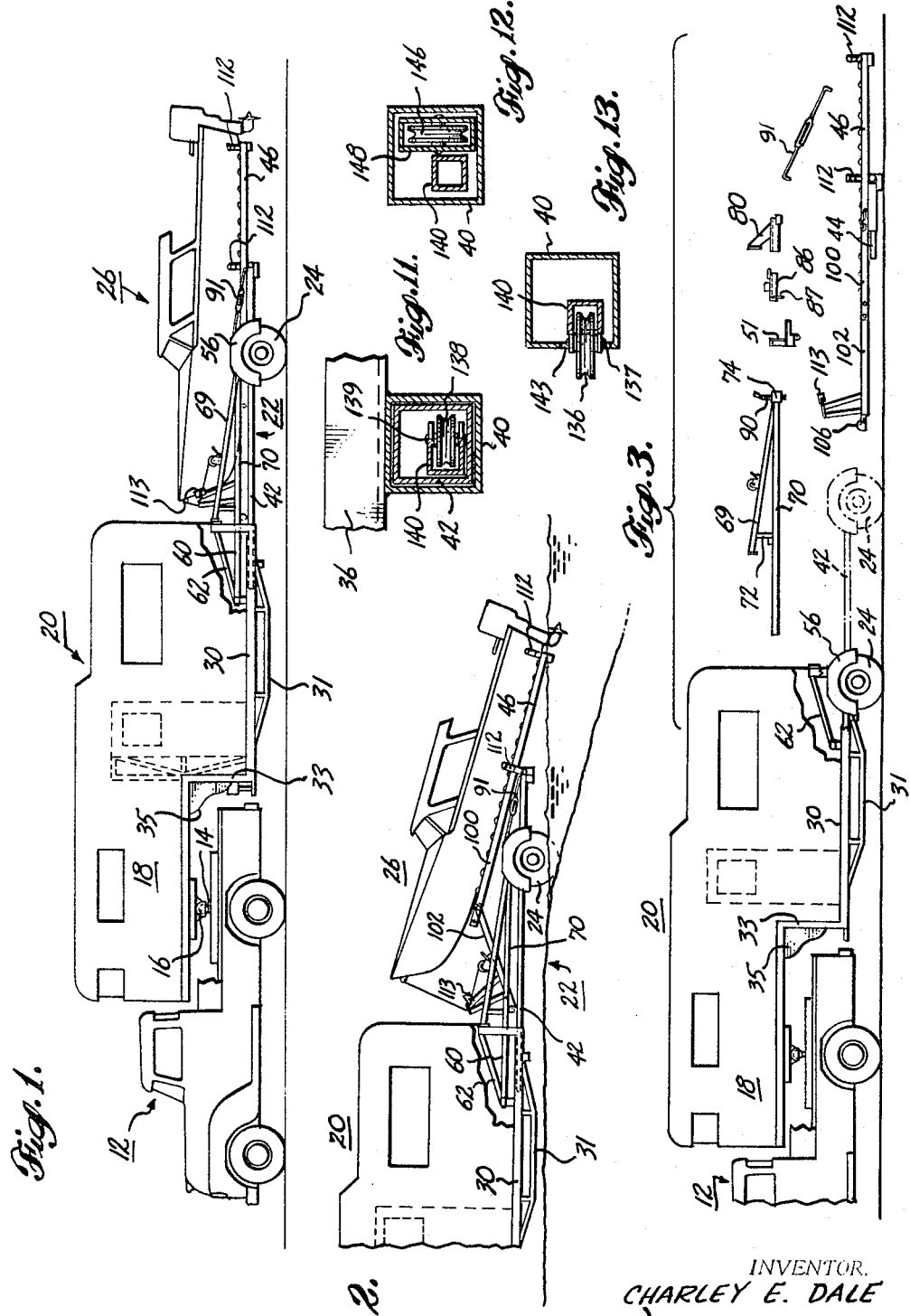

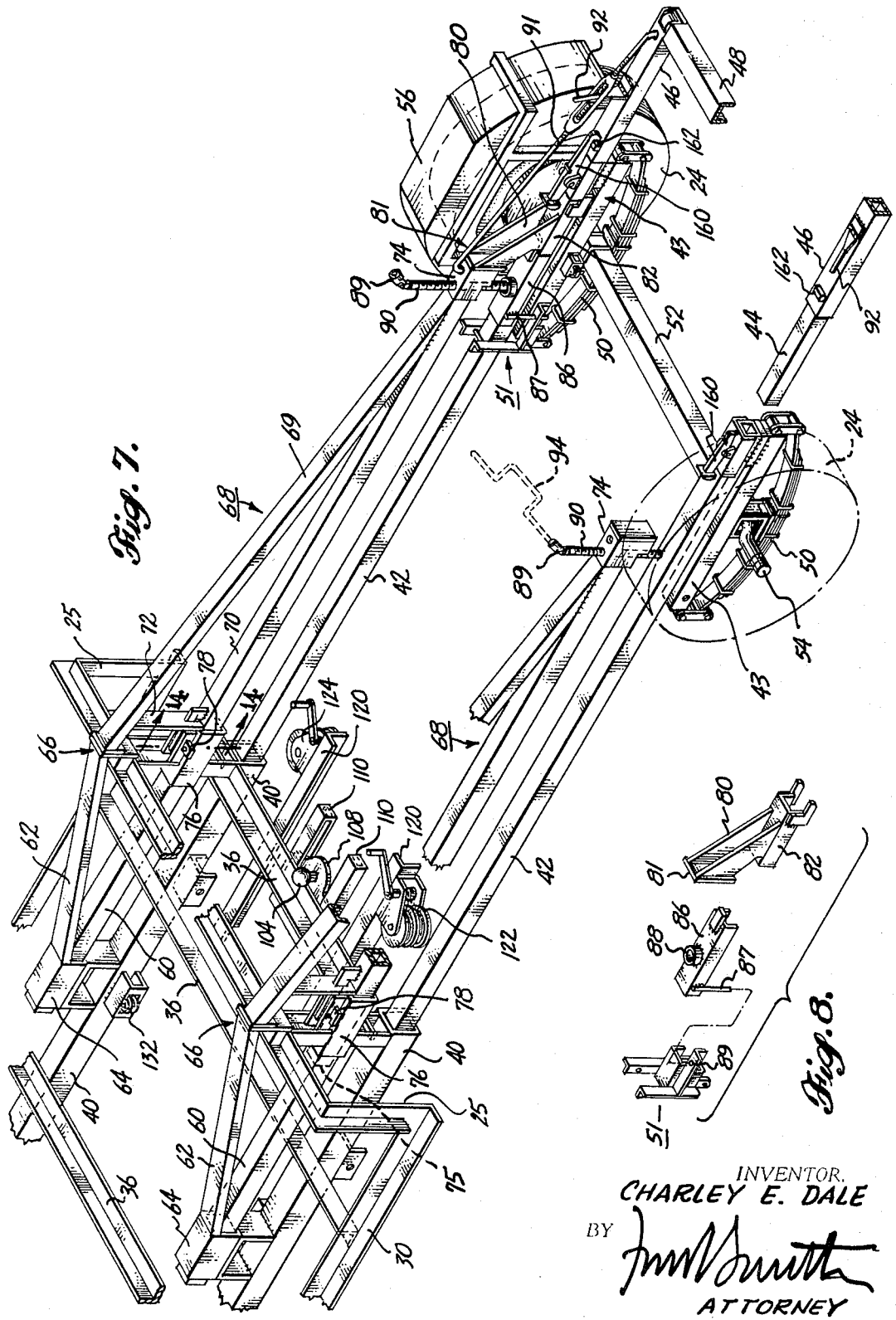

April 30, 1968 C. E. DALE 3,380,607
TRANSPORT EQUIPMENT
Filed April 18, 1966 4 Sheets-Sheet 4
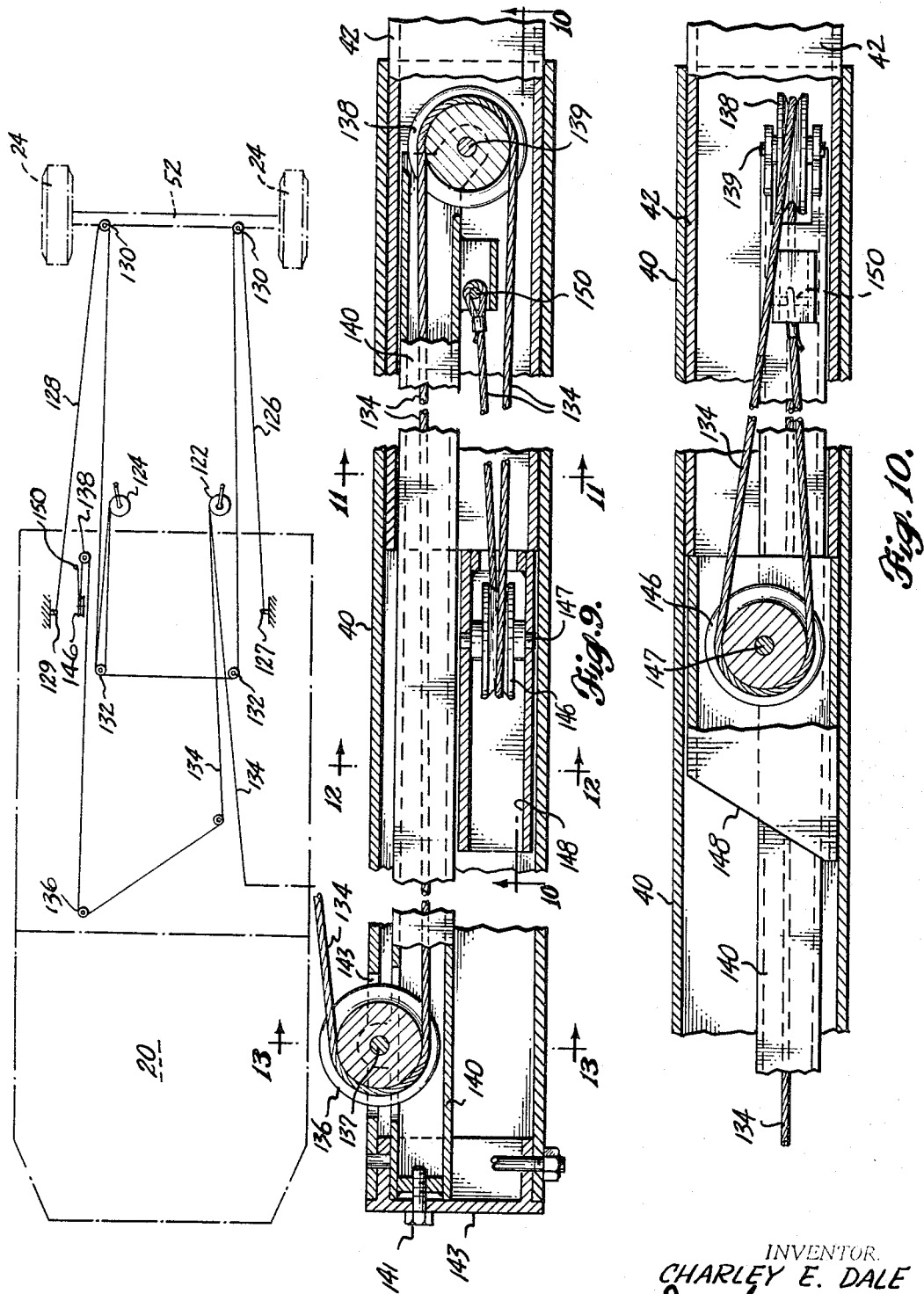
INVENTOR.
CHARLEY E. DALE
BY
ATTORNEY

United States Patent Office 3,380,607
Patented Apr. 30, 1968

3,380,607
TRANSPORT EQUIPMENT
Charley E. Dale, Seattle, Wash., assignor to The Dale-Jones Corporation, Los Altos, Calif., a corporation of California
Filed Apr. 18, 1966, Ser. No. 543,349
7 Claims. (Cl. 214—505)

ABSTRACT OF THE DISCLOSURE

This invention concerns transport equipment and, more particularly, relates to a tractor vehicle and a trailer combination including a tandem frame telescopically associated with the trailer frame for extension and retraction to elongate or compact the load-carrying capacity of the trailer.

Background

While it is common practice to provide a tractor vehicle with a trailer coupled thereto, it is unknown to applicant to provide a trailer frame which is extendible to the rear to supply supplemental transport capacity as the same may be required. More specifically considering the trailer as a housing unit considerable difficulty is encountered by users of such equipment in the transport of boats and the like except that they be either carried atop the trailer or hung on the back of the trailer in a generally unsatisfactory manner. It is common practice for persons who use tractor-trailer combinations of this nature, largely in their pursuit of recreational activity, to desire to have as part of their equipment a boat, not only suitably mounted for safe and practical transport, but also suitably mounted for easy and safe launching as occasion may arise. It is also desirable that when such supplemental transport facility is not being used for its intended purpose it may be closely associated with the trailer frame to reduce the overall length and to make the apparatus as compact as possible.

Object of the invention

The primary object of this invention is the provision of transport equipment in which there is a tractor vehicle having coupled thereto a trailer and a tandem frame which is adapted to be extended rearward or retracted forward relative the trailer housing; which equipment is simple in construction and operation, and at the same time is rugged and durable under conditions of extreme use; and which equipment is arranged for construction at relatively low cost.

Drawings described

FIGURE 1 is a view in side elevation of transport equipment according to this invention showing a tractor having a trailer coupled thereto and a tandem frame for the transport of a boat associated with the trailer frame;

FIGURE 2 is a side elevation view of a portion of the structure of FIGURE 1 showing the boat transport equipment in the boat-launching position, portions being omitted for convenience of illustration;

FIGURE 3 is a fragmentary side elevation view showing truss means normally associated with the tandem frame but removed therefrom and with the tandem frame in part retracted relative the trailer;

FIGURE 4 is a skeletonized plan view of the tractor frame and tandem frame, the latter being partially retracted;

FIGURE 5 is a plan view of a supplemental frame employed in connection with the tandem frame;

FIGURE 6 is an enlarged side view of the trailer and tandem frames viewed as along line 6—6 of FIGURE 4;

FIGURE 7 is a perspective view of the telescopically arranged tandem frame joined in skeleton relation to the trailer frame and the truss means associated therebetween;

FIGURE 8 is an exploded perspective view of the truss anchor means for associating the same with the tandem frame;

FIGURE 9 is a view in part schematic and in part sectional showing the means whereby longitudinal beam members of the tandem frame are extended and retracted relative guideways provided in the tractor frame;

FIGURE 10 is a sectional view taken on lines 10—10 of FIGURE 9;

FIGURE 11 is a cross-section on line 11—11 of FIGURE 9;

FIGURE 12 is a cross-section on line 12—12 of FIGURE 9;

FIGURE 13 is a cross-section on line 13—13 of FIGURE 9; and

FIGURE 14 is a cross-section on line 14—14 of FIGURE 7.

Description

Referring particularly to FIGURE 1, a tractor vehicle 12 of the type commonly described as a "pick-up truck" is shown having, mounted in its body or bed, hitch means preferably comprising an upstanding coupler member 14 to which is fitted a matching coupler member 16 carried on a forwardly protruding portion 18 of the trailer 20. A tandem frame 22 having ground engaging members 24 is shown in extended trailing relation to the trailer 20. In this instance, frame 22 is adapted for the transport of boat 26.

Turning to FIGURE 4, the frame of trailer 20 comprises longitudinal side members 30, 30, stiffened by trusses 31; backbone members 32; Y-brace members 34; and a plurality of cross members 36. These members constitute the deck frame of the trailer 20. It is to be understood that in order to adapt the trailer frame to the overhanging arrangement shown in FIGURES 1 and 3, the forward portion of the frame deck is raised relative the rear portion. Risers 33 that are braced by knees 35 to stiffen the frame, resist stresses and strains to which the frame would normally be subjected during movement over roads.

Incorporated in the trailer frame is a pair of parallel fore-and-aft extending guideways 40, 40 shown in FIGURE 5. Preferably guideways 40, 40 are tubular structural members securely incorporated into the trailer frame, desirably being welded to the cross members 36 in a rigid manner. The guideways 40, 40 are open to the rear.

The tandem trailer 22 frame includes a pair of forwardly extending longitudinal beam members 42, 42 which are telescopically disposed within guideways 40, 40 as shown in FIGURE 11. Beam members 42, 42 are likewise tubular structural members. It is desirable that a fairly close sliding fit exist between the interfitted guides 40 and beams 42 in order to insure rigidity in the association of the tandem frame with the trailer frame.

The rear ends of beams 42 are likewise open to the rear to receive tongues 44 on supplemental frame members 46 which are coupled together across the rear by member 48. This supplemental frame is cantilevered from the rear of the tandem frame 22 as may be seen in FIGURES 5 and 7. Latch 160 pivoted at the rear of beam 42 engages a lug 162 on supplemental frame member 46 as shown in FIGURES 6 and 7. These means retain the parts coupled against accidental dislodgment.

Underlying the rear portion of beam members 42, 42 in spaced relation and attached thereto at the rear only are sub-frame bars 43, 43 beneath which, in conventional manner, are mounted leaf springs 50, 50 coupled to a cross member 52 having wheel axles 54 at the outer ends.

The spacing of bars 43 beneath beams 42 and their forward lack of attachment permits beams 42, 42 to be fully retracted into guideways 40, 40. Ground-engaging wheels 24 are journalled on axles 54. They are shielded by fenders 56 which overlie and cover the upper part of the wheels to entrap dirt and water which may be thrown as the wheels rotate.

Rigidly incorporated in the frame of the trailer 20 in overlying relation to each of the guideways 40, 40 is bracing structure comprising longitudinal base member 60 and the angular brace member 62. Both are rigidly secured together at their forward ends by a coupler 64 which is in turn fastened to a guideway 40. The structures including members 60, 62 at the rear constitute buttresses against which bear truss members to be described. Pads 66, 66, carried by the brace structure, are disposed above the rearwardly open ends of the guideways 40, 40.

The beams 42, 42 of the tandem frame are trussed in their rearwardly extended position by the removable truss members 68, 68 which include the angularly arranged members 69 and 70 separated at their forward ends by riser 72 and joined at their rear end by anchor block 74. The forward end of each member 69 bears against a pad 66. The forward end of each member 70 and the bottom of the riser 72 are associated with a forward extending tongue 75 in line with member 70 which fits into sleeve 76 overlying the rear of each of the guideways 40. The truss member 68 is locked to sleeve 76 by a wedge-locking mechanism 78 shown in FIGURE 7.

Anchor block 74 at the rear of truss member 68 bears against a buttress 80 having a bearing pad 81 and a bifurcated saddle 82 which rests upon and straddles the rear of beam 42. Just forward of saddle 82 is a supplemental saddle 86 that likewise rests on beam 42 and is provided with a socket 88 to receive the lower end of a tightening screw 90 carried by the anchor block 74. A swivelled socket 89 on the upper end of screw 90 may be engaged by a crank wrench 94 for rotation of the screw in raising the truss 68 relative beam 42. A depending pin 87 on saddle 86 fits into a hole 89 in the coupling apparatus 51 by which the forward end of bar 43 is, in spaced relation, coupled to the beam 42 as when the tandem trailer is in use in its rearward extended position. Turnbuckle 91 is mounted between anchor block 74 and the rear of the supplemental frame beam 46 to function as an extensible-retractable truss link between the rear of truss 68 and the rear of the supplemental frame and to support the latter in its cantileved position. A hinged finger 92 is interposed in the slot of the turnbuckle when the same has been adjusted to prevent accidental or vibratory and unintentional rotation or loosening of the turnbuckle.

For the transport of a boat 26, cradling means comprising a longitudinal keel beam 100 is provided. Beam 100 is secured near the rear to cross member 48 of the supplemental frame. A forward extension 102 of beam 100 is adapted to be secured to a trailer hitch ball 104 by hitch cap 106. Pin 103 pivotally connects beam 102 to the keel beam 100. Pin 105, which is removable maintains members 100 and 102 in alignment when hinging action is not desired.

The trailer ball 104 is mounted on plate 108 slideable in guideways 110. Normally the ball is in the forward position shown in FIGURE 4 when the keel beam is in straight alignment. However, plate 108 is permitted to slide to the rear during pivotal action as shown in FIGURE 2 to permit the tilting of the keel member 100 as when it is desired to launch a boat or vice versa. Pairs of cradling rollers 112 are carried by member 100 for receiving the hull of a boat 26.

At the rear of the trailer frame on a pair of rearward extending supports 120 are double-drum winches 122 and 124. Winch 122 is used for withdrawing and extending the tandem frame from its telescopic disposition in the trailer frame. Winch 124 is used for moving the tandem frame forward into the retracted telescopic position. Assuming the extension of the tandem frame relative the trailer frame as shown schematically in FIGURE 9, it will be seen that a pair of cables 126 and 128 are suitably anchored respectively at 127 and 129 to the trailer frame. Each such cable passes around a sheave 130 mounted at the rear of the tandem frame. Then the cables pass forwardly around guide sheaves 132 and thence to the double drum of winch 124. It will be observed that upon rotation of the drums of winch 124, draft is imparted upon cables 126 and 128 and the same are reeled upon the winch drum. This imparts a forward acting force against the rear of the tandem frame and moves the same into closed telescopic relation to the trailer frame. In such case the wheels 24 are disposed as shown in FIGURE 3 in and under the rear of the trailer frame in wheel tunnels 25 formed as shown in FIGURE 7.

When the tandem frame is in retracted position relative the trailer frame, the extension drum or winch 122 is practically devoid of cable. From each of the drums of the winch 122 extend cables 134 each passing around a suitable guide sheave 136 journalled on pin 137 in slots 143 in the wall of the forward end of the guideway member 40. See FIGURES 9 and 13. This is best seen in FIGURE 9.

The cable 134 passes from sheave 136 to the rear and around sheave 138 journalled on pin 139 at the rear of a support bar 140 that extends rearward from the front end of the longitudinal beam member 42. See FIGURE 9 where bar 140 is shown secured at its forward end by bolt 141 to the cap 143 in the forward end of the guideway 40. After passing around sheave 138, cable 134 extends forwardly around sheave 146 journalled on pin 147 in the enclosed floating member 148 within guideway 40 at the forward end of the beam 42. Thence cable 134 extends rearwardly and is anchored at 150 to the hollow bar 140 in relatively close proximity to the sheave 138.

As winch 122 is caused to rotate and force is applied to draw on cables 134 the action is to impart pressure on sheave 146 journalled on pin 147 and the floating member 148 applying pressure thereby to the forward end of beam 42 functions to force the same in a rearward direction. By these means it is possible to easily extend the tandem frame 22 of which the beams 42 constitute the primary telescopic elements.

It will be obvious that changes and alterations in constructional details and substitutions of alternatives may be made in this preferred showing of the invention. All such as fall within the skill of the pertinent art, having reference to a liberal application of the doctrine of equivalents, are intended and will be deemed to be covered by the subjoined claims.

Having thus described the invention, what is claimed is:
1. Transport equipment, comprising:
   a tractor vehicle;
   coupled to said vehicle, a combination boat and camping trailer having a main frame including a parallel pair of fore-and-aft guideways open to the rear;
   a tandem frame including rear ground-engaging members supporting the main and tandem frames and having a forwardly extending pair of longitudinal beam members telescopically disposed in said guideways;
   reciprocally operable means for telescopically moving said tandem frame and the ground-engaging members relative to said main frame; and
   a removable truss means for stiffening said guideways and said beams when said tandem frame is extended relative said main frame to support a load thereon.
2. The structure according to claim 1
   in which the truss means comprises a truss buttress at the rear of the main frame in overlying relation to each of said guideways; and
   a truss member is locked to and overlies each beam member and bears forwardly on a buttress.

3. The structure according to claim 1 in which the tandem trailer is adapted to receive a boat hull for transport.

4. The structure according to claim 3 in which there is a supplemental frame cantilevered from the rear of said tandem trailer and boat-hull cradling means is carried thereby.

5. The structure according to claim 4 in which the boat-hull cradling means comprises an articulated keel beam medially disposed relative the tandem trailer and adapted to tilt between boat loading and boat transporting positions.

6. The structure according to claim 1 in which the reciprocally operable means comprises cables and cable reeling and unreeling winches.

7. The structure according to claim 1 in which the rear ground-engaging members are mounted on support means associated with said tandem frame in underlying, spaced apart relation permitting said members to be substantially wholly under the rear ends of said guideways.

References Cited

UNITED STATES PATENTS

| | | | |
|---|---|---|---|
| 2,797,008 | 6/1957 | Banker | 214—85.1 XR |
| 2,847,136 | 8/1958 | Neff | 214—500 |
| 2,942,744 | 6/1960 | Hall | 214—500 |
| 3,116,949 | 1/1964 | Muse | 214—500 XR |
| 3,167,198 | 1/1965 | Echler et al. | 214—84 XR |
| 3,180,510 | 4/1965 | Moller | 214—506 |

GERALD M. FORLENZA, *Primary Examiner.*

ALBERT J. MAKAY, *Examiner.*